March 27, 1962   L. T. WILCOX   3,026,823
PIE CRUST PERFORATOR
Filed Oct. 10, 1960
FIG. 1
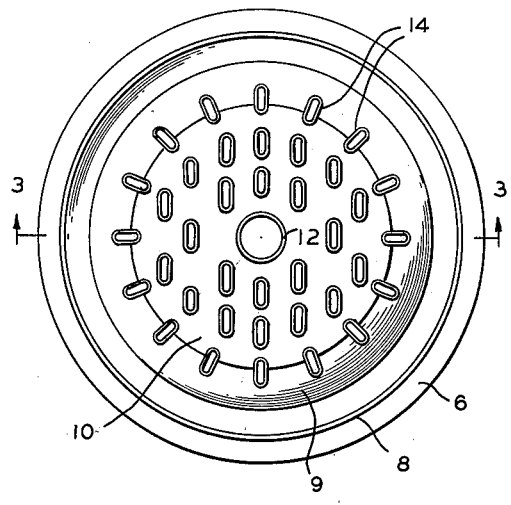
FIG. 2
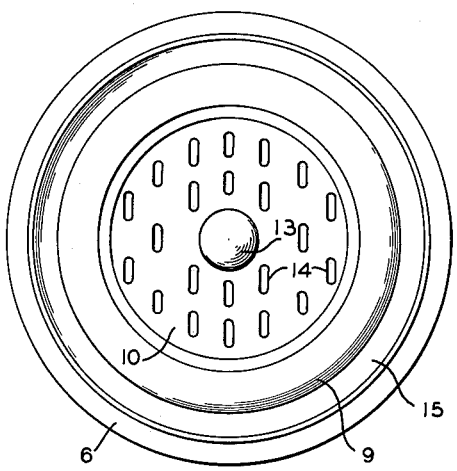
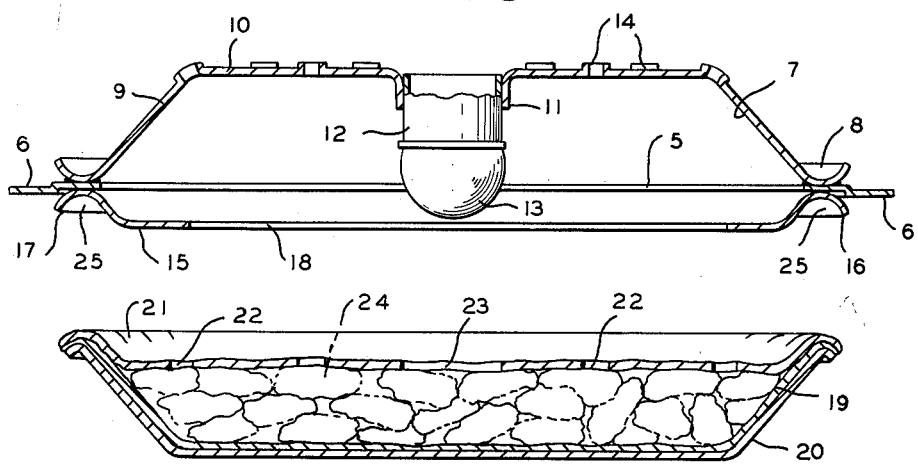
FIG. 3
FIG. 4
INVENTOR.
LESLIE T. WILCOX

3,026,823
PIE CRUST PERFORATOR
Leslie T. Wilcox, 1101 Cherry, Lawton, Okla.
Filed Oct. 10, 1960, Ser. No. 61,608
1 Claim. (Cl. 107—49)

This invention relates to baking equipment, and specifically to a pie crust forming and perforating tool.

The baking art still retains many of the customary hand operations in the manipulation of pastry. Operations such as trimming the edges of a pie crust by circumscribing the plate with a knife, and forming air vents in the top of the pie crust by providing the same with a knife or similar implement remain common practice, and for modern times constitute extremely time consuming operations.

It is therefore a primary object of this invention to provide a device for forming a perforated pie crust from a sheet of rolled pastry in one simple operation.

It is a still further object of this invention to provide a device of the above class which is further provided with means for forming a hole in the centre of the crust and crimping the same around the periphery of the pie plate.

It is yet a further object of this invention to provide a pie crust cutting and perforating device which is simple in construction, effective in operation, and which may be manufactured at low cost.

The invention consists of an upstanding pie crust making form which is secured to a radially projecting holding rim. The top of the form has protruding tubular studs for perforating a pie crust. A sleeved opening formed through the centre of the form receives a sliding cylindrical cutter which may be selectively protruded through the form to make a hole in the crust. A crimping and trimming form depends from the underside of the holding rim for the purpose of pressing the two half crusts together and trimming the same against the edges of a pie plate.

A full understanding of the construction of this invention, together with further novel features and advantages, will be had from the following detailed description of a preferred embodiment thereof, taken in conjunction with the attached drawings wherein:

FIG. 1 is a plan view of the device showing the protruding edges which cut numerous air vents in the surface of the crust.

FIG. 2 is an underside view of the device.

FIG. 3 is a cross sectional side elevation showing the complete assembled device and taken along the line 3—3 of FIG. 1.

FIG. 4 is a cross sectional side elevation taken through a pie having a crust laid thereon and formed by the device which comprises my invention.

Similar reference characters indicate corresponding parts throughout the several views in the drawing.

Referring now to the drawing in detail, the numeral 5 represents a circular holding ring which has an outwardly extending finger rim 6 for the purpose of holding the device.

A pie crust making form 7 is securely fastened by means of an upturned rim 8 to one side of the holding ring 5. The form 7 tapers inwardly and upwardly from the rim 8 to form a conical side wall 9. A top plate 10 connects the upper edge of the side wall as seen best in FIG. 3. The centre of the top plate 10 is pressed inwardly to form a downwardly extending circular sleeve 11 which is adapted to slidingly receive a tubular cutter 12. The cutter enters the sleeve from the underside of the plate and is operated by a finger knob 13 which is sealed to the lower edge of the sleeve. Protruding upwardly above the surface of the top plate 10 are a number of spaced elongated tubular cutting studs 14 which are adapted to cut symmetrically spaced openings in a pie crust laid on the top of the plate.

The other side of the holding ring 5 is sealed to a crust crimping and cutting form 15. The form 15 consists of a downwardly turned rim 16 which terminates with an outwardly extending peripheral cutting edge 17. Inwardly of the rim 16, the form is provided with a circular opening indicated at 18 formed in a horizontal plane located beneath the level of the cutting edge 17.

In operation, the device is laid on a table in a manner indicated in FIG. 3. The dough is rolled in the customary manner and placed lightly over the plate 10 so as to extend over the rim 8. Passing the fingers around the rim will cut out the appropriate pie shell such as 19 which is laid in the bottom of a conventional pie tray 20. The upper crust 21 is now formed on the same mold except that the hand is pressed onto the top plate portion 10 of the form 7 causing openings 22 to be formed therein. If it is desired to form a central hole 23 in the crust, the tubular cutter 12 is forced upwardly to cut through the crust.

After placing the desired contents 24 in the pie shell 19, the pie crust is inverted centrally over the filled shell. The crimping and sealing operation is now performed by the crimping form 15 which is lowered and pressed onto the peripheral portion of the crust. A suitable crimped or undulated surface such as indicated at 25 may be formed on the rim 16 so as to imprint the traditional crimped surface to the periphery of the finished crust 21. The cutting edge 17 will simultaneously trim the two crusts 19 and 21 against the edge of the tray 20.

Having described the invention in a preferred form, it will be appreciated that some modifications may be made to the precise configuration, without departing from the scope or spirit of the invention, as defined by the following claim.

I claim:

A pie crust forming device comprising, an upstanding pie crust making form constiting of a flat circular top plate having a downwardly diverging side wall extending therefrom, said side wall terminating with an upwardly turned rim, a circular holding ring mounted concentrically to the underside of the rim and extending radially outwardly beyond said rim, hollow tubular cutting studs upstanding from the upper side of the plate and forming openings therethrough, a sleeve projecting concentrically and normally on the lower side of the plate, a cylindrical cutter having a finger knob at one end, said cutter slideably received in the sleeve and adapted to project outwardly beyond the upper side of the plate, a ring shaped crimping form secured concentrically to the underside of the holding ring, said ring terminating with a second rim having a downwardly extending cutting edge for cutting engagement with the peripheral edge of a pie plate, said rims being of the same radius and disposed opposite to each other on opposite sides of the holding ring.

References Cited in the file of this patent

UNITED STATES PATENTS

| | | |
|---|---|---|
| 1,088,070 | Haines | Feb. 24, 1914 |
| 1,728,064 | Johnson | Sept. 10, 1929 |
| 2,618,852 | Clough | Nov. 25, 1952 |
| 2,666,401 | McQuaid | Jan. 19, 1954 |

FOREIGN PATENTS

| | | |
|---|---|---|
| 87,930 | Netherlands | Apr. 15, 1958 |